United States Patent
Haines (10) Patent No.: US 6,370,341 B1
(45) Date of Patent: Apr. 9, 2002

(54) CONSUMABLE MANAGEMENT DEVICE, AN IMAGE FORMING SYSTEM, AND A METHOD OF MANAGING AN IMAGING CONSUMABLE OF AN IMAGE FORMING DEVICE

(75) Inventor: Robert E. Haines, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/738,415

(22) Filed: Dec. 13, 2000

(51) Int. Cl.[7] .............................................. G03G 15/00
(52) U.S. Cl. ................................ 399/24; 399/8; 399/81
(58) Field of Search ................................ 399/8, 24, 27, 399/28, 29, 31, 81

(56) References Cited

U.S. PATENT DOCUMENTS 5,594,529 A * 1/1997 Yamashita et al. ............. 399/8

* cited by examiner

Primary Examiner—Arthur T. Grimley
Assistant Examiner—Hoang Ngo (57) ABSTRACT

A consumable management device, an image forming system, and a method of managing an imaging consumable of an image forming device are described. According to an aspect of the present invention, a consumable management device includes an interface adapted to communicate with an image forming device configured to use an imaging consumable to form a hard image, the interface being adapted to receive a status message from the image forming device corresponding to the status of the imaging consumable within the image forming device; storage circuitry configured to store a current inventory status of the imaging consumable within an inventory for the image forming device; and processing circuitry coupled with the interface and configured to update the current inventory status responsive to the status message providing an updated inventory status.

23 Claims, 6 Drawing Sheets

INVENTORY STATUS MESSAGE FLOOR 6-EAST

TO: purchaser@hp.com

FROM: supply_area01@hp.com

| DESCRIPTION | PART NO. | QUANTITY |
|---|---|---|
| TONER | 113K56 | 4 |
| TONER | 113K64 | 8 |
| STAPLES | 123K06 | 3 |
| PAPER | 221J08 | 10 |
| PAPER | 221J09 | 9 |
| LABELS | 226J49 | 2 |

FIG. 5

CONSUMABLE MANAGEMENT DEVICE, AN IMAGE FORMING SYSTEM, AND A METHOD OF MANAGING AN IMAGING CONSUMABLE OF AN IMAGE FORMING DEVICE

FIELD OF THE INVENTION

This invention pertains to a consumable management device, an image forming system, and a method of managing an imaging consumable of an image forming device.

BACKGROUND OF THE INVENTION

Systems and methods relating to document generation have experienced advancements in both host device configurations, such as personal computers, and imaging devices, such as printers. Personal computers operate at faster processing rates with increased storage capacities while imaging devices provide tremendous resolution, color capabilities, and enhanced imaging speeds, for example.

Imaging devices configured to generate hard images use consumables during operation. Expiration of a consumable ceases operation of the corresponding imaging device until replacement of the same.

In some imaging system arrangements, such as network based arrangements comprising numerous imaging devices, a person is assigned with monitoring consumable usage, reordering consumables, etc. to maintain operability of the imaging devices. Such entails the individual manually verifying the amount of consumables remaining within inventory, manually monitoring status of consumables of the respective devices and replenishment of the consumables in inventory and within individual imaging devices when necessary. In systems having perhaps hundreds of imaging devices, the task of monitoring, replacing and maintaining consumables for such imaging devices is increasingly time consuming and subject to misordering of consumables and other errors.

In some applications, consumable items may be stored within a supply closet. When a consumable is expended, a person retrieves a replacement consumable from the closet to replace the expended consumable. In some conventional arrangements, a person manually checks the status of the supply closet from time to time based upon their recollection of a correct amount of the consumable needed.

Problems in such conventional arrangements occur if the supplies are depleted and new supplies are not ordered. Exemplary situations leading to such problems include usage of a consumable at a greater rate than expected, the responsible person forgets to monitor the supply closet or to place an order, or new personnel unfamiliar with consumable usage is responsible to order supplies.

Accordingly, there exists a need to provide improved devices and methodologies to assist with management and replenishment of imaging consumables.

SUMMARY OF THE INVENTION

The invention provides a consumable management device, an image forming system, and a method of managing an imaging consumable of an image forming device.

According to an aspect of the present invention, a consumable management device includes an interface adapted to communicate with an image forming device configured to use an imaging consumable to form a hard image, the interface being adapted to receive a status message from the image forming device corresponding to the status of the imaging consumable within the image forming device; storage circuitry configured to store a current inventory status of the imaging consumable within an inventory for the image forming device; and processing circuitry coupled with the interface and configured to update the current inventory status responsive to the status message providing an updated inventory status.

A second aspect of the invention provides an image forming system comprising: an image forming device configured to use an imaging consumable to form a hard image and to generate a status message corresponding to a status of the imaging consumable within the image forming device; and a consumable management device coupled with the image forming device and configured to store a current inventory status corresponding to the status of the imagining consumable within an inventory for the image forming device, to receive the status message from the image forming device, and to update the current inventory status of the imaging consumable responsive to reception of the status message providing an updated inventory status of the imaging consumable within the inventory.

Another aspect of the invention provides a method of managing an imaging consumable useable by an image forming device to form hard images, the method comprising: storing a current inventory status of the imaging consumable within an inventory for the image forming device; receiving a status message corresponding to the status of the imaging consumable within the image forming device; and updating the current inventory status to provide an updated inventory status responsive to the receiving. Other aspects of the invention are disclosed herein.

Other features and advantages of the invention will become apparent to those of ordinary skill in the art upon review of the following detailed description, claims, and drawings.

DESCRIPTION OF THE DRAWINGS

FIG. 3 is a functional block diagram depicting components of an exemplary image forming device.

FIG. 6 is a screen display of an exemplary inventory status message.

DETAILED DESCRIPTION OF PREFERRED EMBODIMENTS

Figure 1:
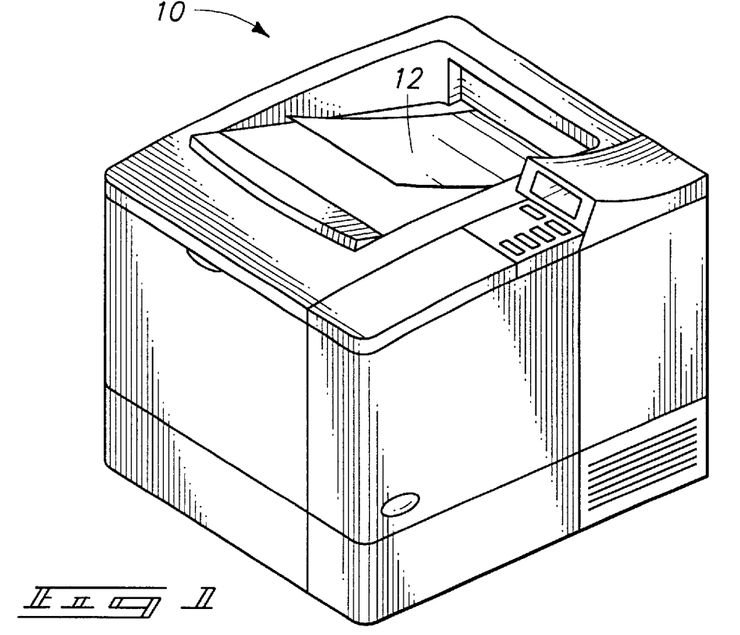
FIG. 1 is an isometric view of an exemplary image forming device.

FIG. 1 depicts an exemplary image forming device 10. Image forming device 10 is configured to form hard images upon media 12 in the described embodiment. One exemplary image forming device 10 comprises a printer, such as a laser printer, ink jet printer, a dot matrix printer, or a dry medium printer. The present invention is embodied within other image forming device configurations such as multiple function peripheral devices, copiers, facsimile machines, plotters, etc. or other arrangements configured to form hard images upon media 12 according to alternative embodiments of the invention. Device 10 is arranged to form hard images upon media 12 including, for example, paper, envelopes, transparencies, labels, etc.

Figure 2:
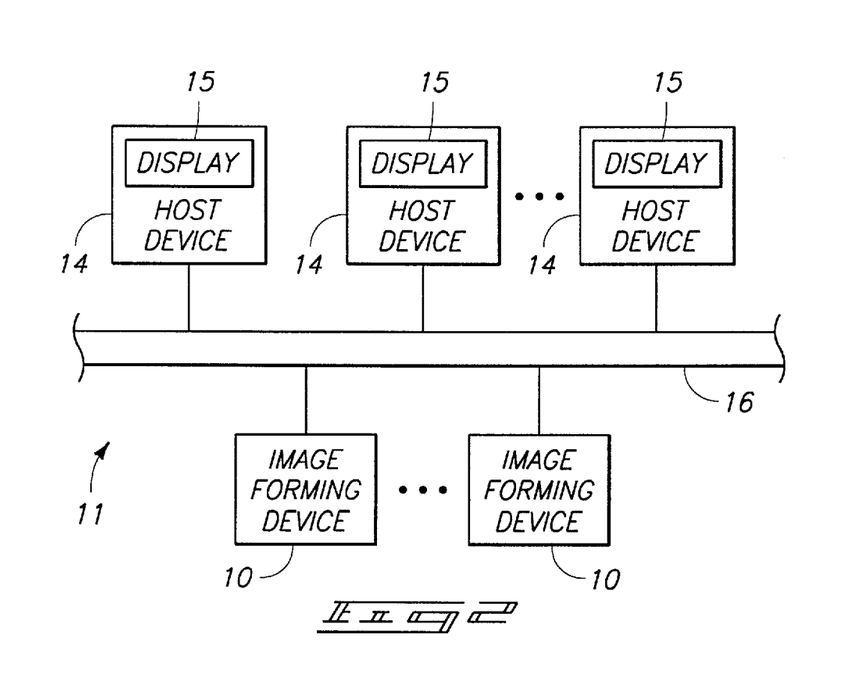
FIG. 2 is a functional block diagram depicting an exemplary image forming system.

Referring to FIG. 2, an image forming system 11 is depicted comprising plural image forming devices 10, plural host devices 14 and a communication medium 16. Communication medium 16 provides connectivity intermediate image forming devices 10 and host devices 14 to implement communications therebetween. An exemplary communication medium 16 includes an Intranet network (e.g., Ethernet arrangement), packet switched network (e.g., Internet) or other communication configurations operable to provide electronic exchange of information between image forming devices 10 and host devices 14. Other image forming systems 11 of the invention include more or less devices 10, 14 depending upon a given configuration or application.

In general, host devices 14 are implemented as personal computers (PCs), servers, or other devices configured to communicate with image forming devices 10. Host devices 14 individually include a display 15, such as a CRT or flat panel monitor, to display information to a user.

At least some host devices 14 execute applications wherein formation of hard images upon media is desired. For example, host devices 14 comprising personal computers in one exemplary configuration execute an appropriate word processor, spread sheet, or other application capable of generating hard images, such as images upon appropriate media. Individual host devices 14 communicate image data via communication medium 16 to an appropriate image forming device 10 for hard imaging. Alternatively, image data to be printed or otherwise imaged using image forming devices 10 is supplied from other external devices (not shown) coupled with, for example, communication medium 16.

Referring to FIG. 3, exemplary components of a single image forming device 10 are shown. As illustrated, the depicted image forming device 10 includes a clock 18, storage circuitry 20, processing circuitry 22, imaging circuitry 24, a sensor 26, a sensor 27, and an interface 28 individually coupled with a communication medium 30. Other configurations of image forming device 10 are provided in alternative arrangements (not shown).

Clock 18 is arranged to provide information regarding current moments in time. For example, clock 18 provides year, month, day and/or time information. In the depicted configuration, clock 18 is programmed upon installation within system 11. Updated timing information to verify the accuracy of clock 18 or to control timing within device 10 may be received from a timing source (not shown) external of image forming device 10.

Storage circuitry 20 is configured to store instructions for controlling various operations of image forming device 10 and other information or data as described in further detail below. Exemplary storage circuitry 20 comprises non-volatile memory (e.g., EEPROM, flash memory and/or read only memory (ROM)), random access memory (RAM), and hard disk and associated drive circuitry. Storage circuitry 20 is configured to store executable instructions as firmware or software configured to control operations of image forming device 10. Further, storage circuitry 20 stores image data used for the formation of hard images and any other appropriate information to be stored within image forming device 10.

Processing circuitry 22 is implemented as a dedicated microprocessor in the depicted embodiment of image forming device 10. Other arrangements of processing circuitry 22 are possible. Processing circuitry 22 is configured to execute a plurality of ordered executable instructions implemented as firmware and/or software. The ordered instructions are executed to control image forming operations within image forming device 10, to provide monitoring of components of device 10, to provide monitoring of imaging consumables used during imaging operations, and other operations of device 10.

Imaging circuitry 24 is configured to form hard images upon media 12 responsive to image data. In the described printer embodiment, imaging circuitry 24 includes print circuitry arranged to print images upon media 12. In the exemplary described embodiment, imaging circuitry 24 includes paper path components (not shown) to implement movement of media 12 within image forming device 10, developing components (not shown) configured to provide a developing material, such as toner, upon media 12, fusing components (not shown) configured to affix the developing material to media 12 as well as any other components (not shown) to implement other desired processing or imaging operations, such as downstream processing of media (e.g., stapling, collating, etc).

Sensors 26, 27 are provided in the disclosed embodiment to monitor operations within imaging circuitry 24 of image forming device 10. Imaging circuitry 24 consumes imaging consumables during the formation of hard images. Exemplary imaging consumables include developing material, media, staples, and components having a fixed life span (e.g., fusing assembly and/or developing assembly). Plural sensors 26, 27 are provided to monitor plural imaging consumables, such as developing material and media, according to some aspects of the invention. More or less sensors are provided in other configurations of image forming device 10. Further, other imaging consumables may also be monitored depending upon the configuration of image forming device 10.

In the described embodiment, sensors 26, 27 are arranged to monitor respective statuses of plural imaging consumables. Status of an imaging consumable may be represented in a plurality of ways. For example, sensors 26, 27 are arranged in one embodiment to monitor remaining capacities of respective imaging consumables (e.g., amount of toner in weight or volume remaining for usage, amount of fuser life in hours remaining for usage). Alternatively, sensors 26, 27 are configured to monitor usage of the respective imaging consumables. Sensors 26, 27 may be additionally configured to indicate both remaining capacity and usage of respective consumables. The remaining capacity and/or usage information may be indicated in terms of weight, volume, hours, or any other unit capable of indicating usage or remaining capacity of the respective imaging consumables.

Sensors 26, 27 are configured to output respective signals indicative of the statuses (e.g., usage and/or remaining life) of imaging consumables to communication medium 30. Processing circuitry 22 is configured to receive and process the respective signals from medium 30.

Interface 28 is configured to implement connectivity of image forming device 10 to external components via an appropriate communication medium, for example. An exemplary interface 28 comprises a network interface card (NIC), such as a JetDirect(tm) card, available from Hewlett-Packard Company. In the illustrated embodiment, interface 28 is coupled with communication medium 16. Image data, status information and any other desired data is received within and outputted from image forming device 10 using interface 28 in the described implementation.

Image forming devices 10 are individually operable to implement various functions regarding usage of imaging consumables during imaging and other operations, and replenishing of such imaging consumables. Image forming devices 10 assist a user (e.g., purchaser or other desired entity concerned with maintenance of consumables) with replenishment of imaging consumables responsive to signals received from sensors 26, 27. Image forming devices 10 are operable to output an indication of the statuses of respective imaging consumables externally of device 10 using interface 28.

More specifically, and in one exemplary configuration, processing circuitry 22 receives the generated signals regarding statuses of imaging consumables from respective sensors 26, 27. Processing circuitry 22 formulates messages which are forwarded externally of device 10 to appropriate recipients for facilitating reordering of imaging consumables. As described below, exemplary messages generated by processing circuitry 22 include status messages identifying the imaging consumable, identifying the communicating device 10, and/or the status of the imaging consumable.

In one implementation, one of the provided host devices 14 of system 11 is associated with a purchaser of imaging consumables for respective ones of image forming devices 10 or other described recipient. In such a configuration, an e-mail address, uniform resource locator (URL) or other identifier of such host device 14 is provided within storage circuitry 20 of respective image forming devices 10 which are monitored by the purchaser or recipient.

Following an indication from sensors 26, 27 of one or more imaging consumable being at a predetermined status (e.g., low remaining capacity), processing circuitry 22 formulates an appropriate message for application to the given host device 14 as identified by the identifier stored within storage circuitry 20. In the depicted embodiment, processing circuitry 22 configures messages as e-mail messages for communication using communication medium 16. Other formats of messages are possible.

Figure 4:
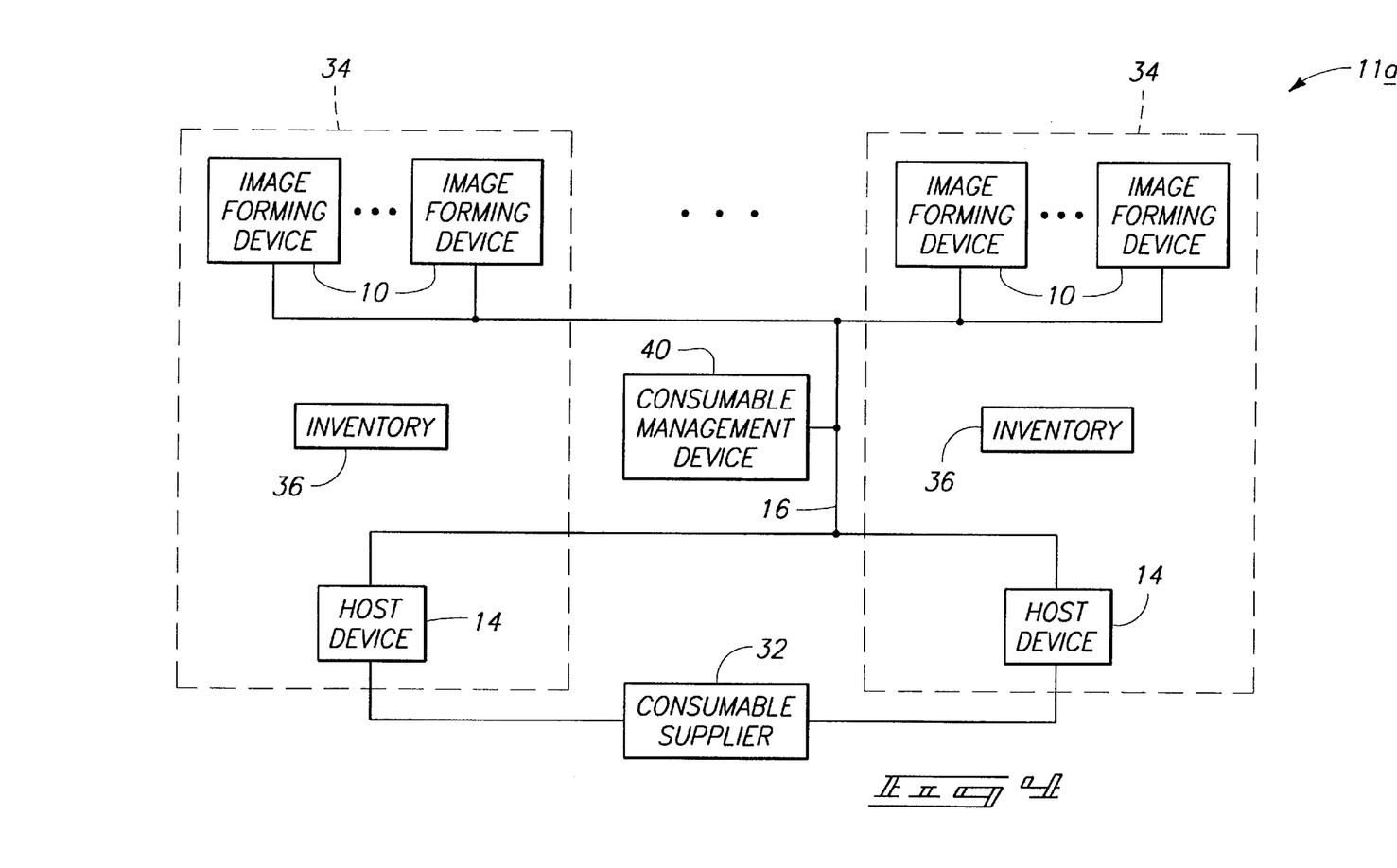
FIG. 4 is a functional block diagram depicting an exemplary image forming system embodying aspects of the present invention.

Referring to FIG. 4, an exemplary arrangement of image forming system 11a utilizing a plurality of image forming devices 10 is depicted for explanation of exemplary aspects of the present invention. Like reference numbers herein represent like components with differences therebetween being represented by a suffix, such as "a."

The illustrated arrangement of FIG. 4 corresponds to, in one example, a workplace environment. Plural image forming devices 10 are provided shown coupled with communication medium 16. Devices 10 are distributed throughout a workplace environment in the described arrangement. Host devices 14 and a consumable management device 40 are also depicted coupled with communication medium 16.

Further, plural supply areas 34 are illustrated with respective inventories 36 in the depicted arrangement. Supply areas 34 individually include one or more image forming device 10. Supply areas 34 also include an associated host device 14 in the described configuration. Additional host devices 14, such as user personal computers, are typically provided although not shown in FIG. 4 to interface with image forming devices 10 for formation of images, such as document generation.

Inventories 36 include one or more imaging consumable usable by associated image forming devices 10 of the respective supply area 34. In a workplace environment, exemplary individual inventories 36 are implemented as a supply closet configured to store one or more imaging consumable. In some arrangements, one supply area 34 corresponds to a master supply area and another supply area 34 corresponds to a satellite supply area.

The depicted host devices 14 within supply areas 34 may be referred to as purchaser devices and are associated with individuals or other entities responsible for management (e.g., ordering, stocking, etc.) of imaging consumables within respective inventories 36 of the respective supply areas 34. In another arrangement (not shown), a single host device 14 is responsible for a plurality of supply areas 34.

The illustrated purchaser host devices 14 forward purchase orders or requests (e.g., inventory status messages) to a consumable supplier 32 in the described embodiment. Consumable supplier 32, such as a reseller, in turn, supplies imaging consumables to system 11a for stocking within respective inventories 36. In another arrangement, consumable supplier 32 is coupled with communication medium 16 to receive communications.

As described previously, status messages are generated to indicate status of imaging consumables. Individual image forming devices 10 operate to communicate status messages to communication medium 16 during operation indicating status of internal imaging consumables. In the described embodiment, status messages generated by devices 10 and concerning statuses of respective imaging consumables are forwarded to consumable management device 40. Individual exemplary status messages generated by devices 10 include identifiers in the described embodiment identifying the particular device 10 communicating the status message which also identifies the corresponding supply area 34. According to additional aspects of the invention, other devices, such as purchaser host devices 14, also generate status messages when necessary for application to consumable management device 40.

In one exemplary arrangement, consumable management device 40 is implemented as one of the devices of image forming system 11 shown in FIG. 2. For example, consumable management device 40 may be implemented as a host device 14, comprising a personal computer or server. Alternatively, consumable management device 40 is implemented within one of image forming devices 10 or other device capable of maintaining and tracking imaging consumables and communicating messages externally of device 40, if desired.

Figure 5:
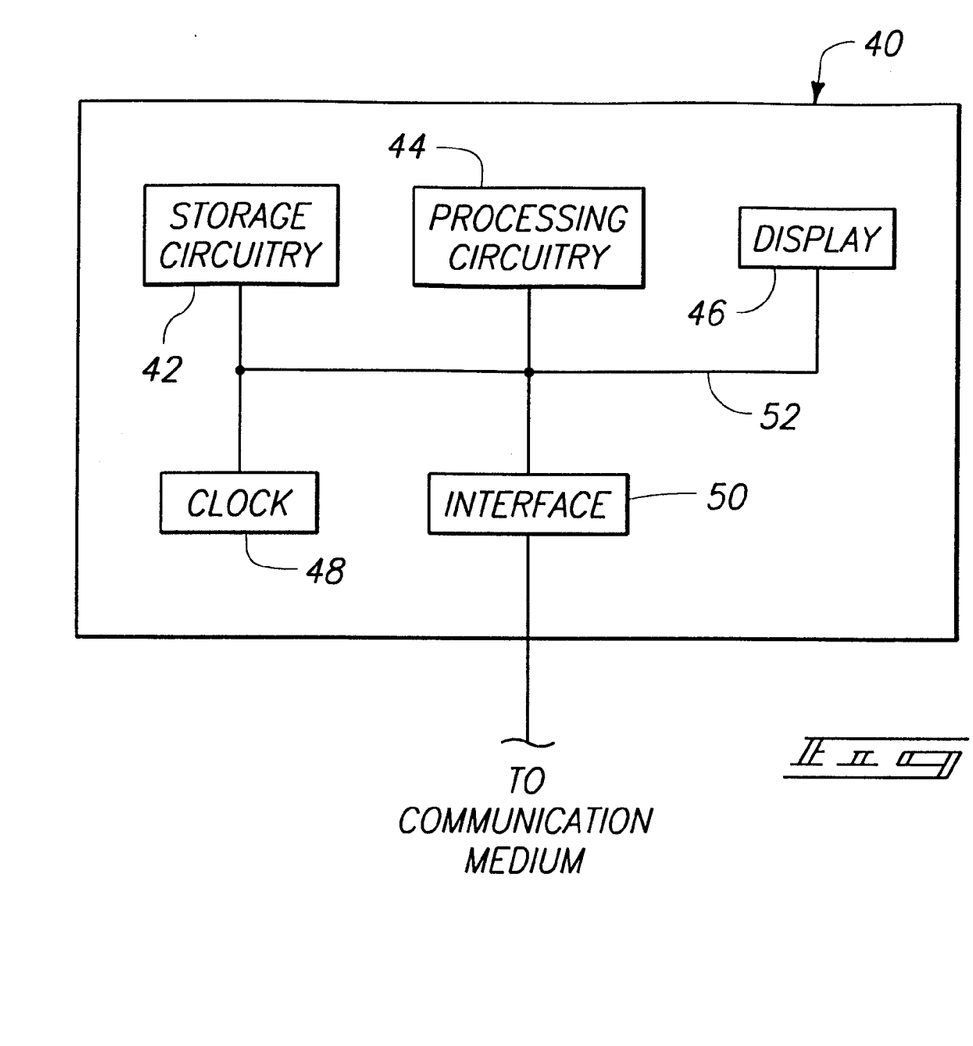
FIG. 5 is a functional block diagram depicting components of an exemplary consumable management device according to aspects of the present invention.

Referring to FIG. 5, an exemplary consumable management device 40 is illustrated. Consumable management device 40 in the described embodiment includes storage circuitry 42, processing circuitry 44, a display 46, a clock 48, and an interface 50 individually coupled with a communication medium 52. Communication medium 52 is configured as an internal bus to implement communication functionality intermediate components of device 40.

As described hereafter, exemplary aspects of consumable management device 40 are disclosed regarding monitoring and maintaining statuses of imaging consumables within respective inventories 36 and generating, if appropriate, messages regarding the statuses of imaging consumables within inventories 36.

Inventory status (current or updated) refers to identification information and quantity information of one or more imaging consumable within a given inventory 36. The inventory status decreases over time as imaging consumables are retrieved from inventory 36 and supplied to image forming devices 10 for replenishment of imaging consumables therein. Inventory status message refers to imaging consumables used during a given period of time. Inventory status messages comprise purchase orders in exemplary embodiments used for the reordering of one or more imaging consumable from an appropriate consumable supplier 32.

Inventory status and inventory status messages are updated responsive to status messages regarding usage of imaging consumables. Once an image forming device 10 generates and outputs a status message regarding an imaging consumable, it is assumed that the corresponding imaging consumable is retrieved from respective inventory 36 to replenish the imaging consumable within device 10. Consumable management device 40 subtracts the imaging consumable from current inventory status providing an updated inventory status. According to other described aspects, the imaging consumable is added to an appropriate inventory status message to facilitate reordering of the imaging consumable when appropriate.

Storage circuitry 42 stores inventory statuses of one or more imaging consumable within inventories 36 accessible to the respective image forming devices 10 within respective supply areas 34. Exemplary storage circuitry 42 comprises non-volatile memory (e.g., EEPROM, flash memory and/or read only memory (ROM)), random access memory (RAM), and hard disk and associated drive circuitry. In addition, storage circuitry 42 stores executable instructions as firmware or software configured to control operations of consumable management device 40.

Clock 48 is configured to provide current timing information, such as, year, month, day and time information in the described embodiment.

Interface 50 coupled with communication medium 16 is configured to receive status messages concerning status of imaging consumables of respective image forming devices 10 and communicate inventory status messages externally of device 40. An exemplary interface 50 comprises a JetDirect card.

Processing circuitry 44 comprises a dedicated microprocessor in the depicted exemplary configuration. Processing circuitry 44 processes status messages regarding imaging consumables received within consumable management device 40. Processing circuitry 44 accesses storage circuitry 42 to replace a current inventory status with an updated inventory status. Processing circuitry 44 also generates inventory status messages corresponding to the current or updated inventory statuses of one or more imaging consumable of the respective inventories 36. Processing circuitry 44 controls communication of inventory status messages externally of device 40, for example, to a respective purchaser host device 14.

In the described embodiment, consumable management device 40 operates to communicate the inventory status messages responsive to the occurrence of predetermined events. For example, according to one exemplary aspect, processing circuitry 44 monitors clock 48 and communicates the proper inventory status messages at predetermined moments in time (e.g., 8:00 am at the first of the month, first of a week, etc.).

According to other aspects, consumable management device 40 communicates inventory status messages responsive to the current or updated inventory statuses of one or more imaging consumable being at a predetermined status. For example, processing circuitry 44 monitors the current or updated inventory statuses of respective imaging consumables. Thereafter, processing circuitry 44 communicates an inventory status message responsive to the current or updated inventory status of an imaging consumable being below a predetermined status (e.g., amount of the imaging consumable remaining in inventory). According to such described aspects, consumable management device 40 communicates the inventory status messages to enable replenishment of the imaging consumable(s) within inventories 36 before such is entirely consumed.

As previously described, processing circuitry 44 generates inventory status messages responsive to receipt of status messages from image forming devices 10. In accordance with other aspects of the present invention, processing circuitry 44 is operable to modify inventory status messages previously generated.

For example, processing circuitry 44 forecasts usage of imaging consumables according to some aspects of the invention. In such an arrangement, processing circuitry 44 monitors information of clock 48 and modifies the inventory status message responsive to forecasting using timing information. Such is beneficial if it is historically known that a given imaging consumables is used more or less at a certain time of year, month or other time increment. If desired, processing circuitry 44 increases or decreases the status (e.g., quantity to be ordered) of one or more imaging consumable within the inventory status message responsive to the forecasting.

According to additional aspects of the invention, respective inventories 36 may have predetermined limits concerning the quantities or amounts of imaging consumables which may be stored, due to for example, space limitations. Processing circuitry 44 reviews inventory status messages following the generation thereof. Processing circuitry 44 is thereafter configured to modify inventory status messages if it is determined that such would result in the ordering of an amount of an imaging consumable which would exceed a predetermined limit. If the amount of an imaging consumable is reduced within the inventory status message, processing circuitry 44 adjusts the timing of issuance of subsequent inventory status messages to a more frequent basis to minimize the chances of the reduced imaging consumable being completely consumed before replenishment. Processing circuitry 44 also adds the reduced imaging consumable to one or more such subsequent inventory status message.

In other aspects of the present invention, processing circuitry 44 is configured to monitor the presence of imaging devices 10 coupled therewith. For example, it may routinely poll associated devices 10 to determine which devices are provided within image forming system 11a (and identify devices 10 in appropriate areas 34) at any given moment in time inasmuch as devices 10 are dynamically added and subtracted in some system applications. Upon detection of a new device 10, or removal of a previously existing device 10, processing circuitry 44 modifies the inventory status responsive to change. In but one example, if a given device 10 indicated a need for a given imaging consumable within a status message, and that device 10 is subsequently removed from respective area 34 of system 11a, then processing circuitry 44 removes the indicated imaging consumable from the inventory status. Other alterations of inventory status messages responsive to polling of devices 10 are possible.

As shown in FIG. 4, a plurality of supply areas 34 are provided in system arrangement 11a. At times, it may be desired to transfer one or more imaging consumable from one supply area 34 to another supply area 34 to address immediate needs, or for other reasons. Processing circuitry 44 is arranged according to additional aspects of the invention to modify respective inventory statuses responsive to movement of a quantity of one or more imaging consumable between supply areas 34 or with respect to a given one supply area 34. A purchaser associated with a device 14 forwards a status message or other indication according to one application to consumable management device 40 which indicates the movement of the imaging consumables between the respective supply areas 34 or with respect to the one supply area 34. Processing circuitry 44 appropriately adjusts the respective current or updated inventory status(es) to reflect the movement of the one or more imaging consumable and adjusts the inventory status message(s), if proper.

Further aspects allow consumable management device 40 to analyze the current or updated inventory status and to provide additional modification or adjustments as necessary. For example, limits may be established for certain imaging consumables to avoid having an extensive supply of one imaging consumable within inventory 36 and inadequate amounts of another imaging consumable. Other modifications of current or updated inventory statuses, and inventory status messages are possible in accordance with the present invention.

According to further aspects of the invention, host devices 14, or other devices, are provided with access to a given consumable management device 40 to retrieve a current or updated inventory status, inventory status messages, and/or projection of consumable usage, for example. Further, host device 14 or other similar device, when appropriate, may instruct consumable management device 40 to initiate the communication of the inventory status message, reset the inventory status within consumable management device 40, otherwise adjust the timing of a communication of a next inventory status message, or perform other operations with respect to the inventory statuses and/or inventory status messages.

Following generation of the inventory status messages, and implementation of any appropriate modifications thereof, the inventory status messages are communicated according to additional aspects of the present invention. According to first such aspects, processing circuitry 44 forwards the inventory status messages to display 46 for depiction of a visual image corresponding to the inventory statuses and/or inventory status messages of imaging consumables within respective inventory 36. In addition, or alternatively, processing circuitry 44 forwards inventory statuses and/or inventory status messages to interface 50 for communication to a purchaser host device 14 or other device associated with a purchaser or other entity responsible for management of consumables. Other communication methodologies of inventory statuses and/or inventory status messages are possible in accordance with the present invention.

Referring to FIG. 6, an exemplary inventory status message corresponding to a respective inventory 36 and supply area 34 is shown. The depicted inventory status message 60 is provided in the form of an e-mail message. Other arrangements of inventory status messages 60 are possible and individual inventory status messages 60 may be provided within other communication configurations according to other embodiments.

The depicted inventory status message 60 is in the form of a purchase order including a supply area identifier 61, a plurality of imaging consumable descriptions 62, a plurality of imaging consumable identifiers 64, and respective quantity information 64 for respective imaging consumables. In addition, the depicted inventory status message 60 includes an identifier 68 of the host device 14 or other entity responsible for maintaining imaging consumables within the respective supply area 34. Further, an identifier 70 is also provided to identify the communicating consumable management device 40.

Figure 7:
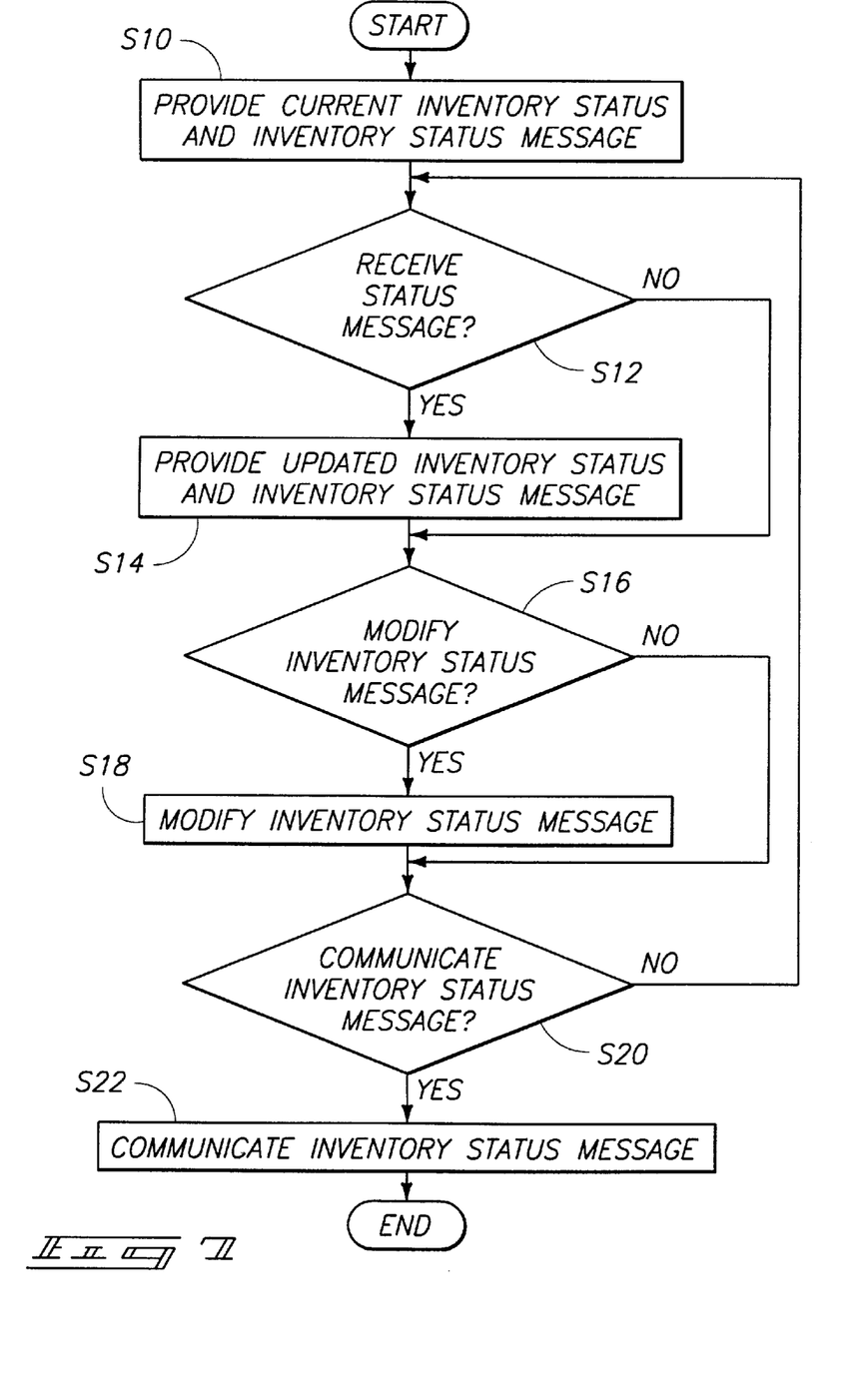
FIG. 7 is a flow chart depicting an exemplary methodology executable within the consumable management device.

Referring to FIG. 7, an exemplary methodology for implementing above-described aspects of the present invention is shown. Other methodologies are possible. The depicted methodology is implemented as a series of ordered executable instructions stored within storage circuitry 42 which are presented to processing circuitry 44 for execution. In other alternative configurations, the depicted methodology is implemented in hardware.

At a step S10, processing circuitry 44 provides a current inventory status corresponding to the status of imaging consumables present within respective inventory 36, and an inventory status message corresponding to imaging consumables to be ordered (if any). The current inventory status and inventory status message are provided corresponding to initial or current amounts of imaging consumables within the respective inventory 36.

At a step S12, it is determined whether a status message has been received within consumable management device 40. If not, processing circuitry 44 proceeds to a step S16.

Otherwise, at a step S14, processing circuitry 44 provides an updated inventory status and updates the inventory status message utilizing information regarding the imaging consumable within the received status message at step S12.

At a step S16, it is determined whether modification of the inventory status message is necessary. If not, processing circuitry 44 proceeds to a step S20.

Otherwise, at a step S18, processing circuitry 44 modifies the inventory status message as necessary. Exemplary modifications result from a maximum limit of a given imaging consumable which may be stored within inventory 36, forecasting, and/or the addition or subtraction of an image forming device 10 within a respective supply location 34 as described previously. Other modifications of the inventory status message are also possible.

At a step S20, it is determined whether communication of the inventory status message is proper. Such is based upon a predetermined moment in time, a status of a given imaging consumable within inventory 36, or other criteria. If the condition of step S20 is in the negative, processing circuitry 44 returns to step S12.

Otherwise, processing circuitry 44 proceeds to a step S22 and communicates the inventory status message. The inventory status message is forwarded to display 46 for visual communication, forwarded to interface 50 for communication externally of consumable management device 40, and/or other communication.

The present invention provides monitoring of usage of imaging consumables in a convenient arrangement. Identification of imaging consumables being utilized and the rate of usage is provided according to the disclosed aspects of the present invention. Imaging consumables are monitored and may be replenished by a purchaser before they are depleted, even if such requires ordering before a next regularly scheduled order.

Aspects of the present invention also enable a purchaser to place an order without manually checking inventory of the imaging consumables. However, It may be desirable for the purchaser to manually verify contents of inventory on a periodic schedule (perhaps every other order for imaging consumables). The invention reduces the amount of human intervention for monitoring of imaging consumables in inventory.

The protection sought is not to be limited to the disclosed embodiments, which are given by way of example only, but instead is to be limited only by the scope of the appended claims.

What is claimed is:

1. A consumable management device comprising:
   an interface adapted to communicate with an image forming device configured to use an imaging consumable to form a hard image, the interface being adapted to receive a status message from the image forming device corresponding to the status of the imaging consumable within the image forming device;
   storage circuitry configured to store a current inventory status of the imaging consumable within an inventory for the image forming device; and
   processing circuitry coupled with the interface and configured to update the current inventory status responsive to the status message providing an updated inventory status;
   wherein the processing circuitry is further configured to generate an inventory status message corresponding to the status of the imaging consumable within the inventory and the inventory status message comprising an order including an identifier and a quantity of the imaging consumable and the processing circuitry is further configured to address the order for communication externally of the consumable management device using the interface.

2. The device in accordance with claim 1 wherein the storage circuitry is configured to store the current inventory status corresponding to at least one of a plurality of supply areas, the interface is configured to receive another status message indicating movement of a quantity of the imaging consumable from one supply area to another supply area, and the processing circuitry is configured to update at least one of the current and the updated inventory status responsive to the another status message.

3. The device in accordance with claim 1 wherein the interface is configured to communicate the order externally of the consumable management device.

4. The device in accordance with claim 1 wherein the processing circuitry is configured to communicate the inventory status message responsive to the updated inventory status being at a predetermined status.

5. The device in accordance with claim 1 wherein the processing circuitry is configured to forecast usage of the imaging consumable and to modify the inventory status message responsive to the forecast.

6. The device in accordance with claim 1 wherein the processing circuitry is configured to communicate the inventory status message at a predetermined moment in time.

7. The device in accordance with claim 6 wherein the processing circuitry is configured to detect a quantity of the imaging consumable within the inventory status message exceeding a predetermined limit, and to modify the inventory status message and the predetermined moment in time responsive to the detection.

8. The device in accordance with claim 1 further comprising a display configured to depict visual images, wherein the processing circuitry is configured to forward the inventory status message to the display, and the display is configured to depict a visual image corresponding to the inventory status message.

9. The device in accordance with claim 1 wherein the processing circuitry is configured to forward the inventory status message to the interface for communication to a host device associated with a purchaser of the imaging consumable.

10. The device in accordance with claim 1 wherein the interface is configured to couple with a plurality of image forming devices and the processing circuitry is configured to monitor the image forming devices coupled with the interface and to modify the inventory status message responsive to the monitoring.

11. An image forming system comprising:
    an image forming device configured to use an imaging consumable to form a hard image and to generate a status message corresponding to a status of the imaging consumable within the image forming device; and
    a consumable management device coupled with the image forming device and configured to store a current inventory status corresponding to the status of the imagining consumable within an inventory for the image forming device, to receive the status message from the image forming device, and to update the current inventory status of the imaging consumable responsive to reception of the status message providing an updated inventory status of the imaging consumable within the inventory;
    wherein the consumable management device is configured to generate an inventory status message corresponding to the status of the imaging consumable within the inventory;
    wherein the consumable management device is configured to forward the inventory status message to the interface for communication to a host device associated with a purchaser of the imaging consumable.

12. The system in accordance with claim 11 wherein the consumable management device is configured to communicate the inventory status message responsive to the updated inventory status being at a predetermined status.

13. The system in accordance with claim 11 wherein the consumable management device is configured to communicate the inventory status message at a predetermined moment in time.

14. The system in accordance with claim 11 wherein the consumable management device is configured to communicate the inventory status message to a purchaser of the imaging consumable.

15. The system in accordance with claim 11 wherein the consumable management device comprises a display configured to depict a visual image corresponding to the inventory status message.

16. The system in accordance with claim 11 wherein the image forming device comprises a printer.

17. A method of managing an imaging consumable useable by an image forming device to form hard images, the method comprising:
    storing a current inventory status of the imaging consumable within an inventory for the image forming device;
    receiving a status message corresponding to the status of the imaging consumable within the image forming device;
    updating the current inventory status to provide an updated inventory status responsive to the receiving;
    generating an inventory status message corresponding to the status of the imaging consumable within the inventory; and
    addressing the inventory status message to a purchaser of the imaging consumable.

18. The method in accordance with claim 17 further comprising communicating the inventory status message responsive to the updated inventory status being at a predetermined status.

19. The method in accordance with claim 17 further comprising communicating the inventory status message at a predetermined moment in time.

20. The method in accordance with claim 17 further comprising communicating the inventory status message to the purchaser of the imaging consumable after the addressing.

21. The method in accordance with claim 17 further comprising:

forecasting usage of the imaging consumable; and modifying the inventory status message responsive to the forecasting.

22. A consumable management device comprising:

an interface adapted to communicate with an image forming device configured to use an imaging consumable to form a hard image, the interface being adapted to receive a status message from the image forming device corresponding to the status of the imaging consumable within the image forming device;

storage circuitry configured to store a current inventory status of the imaging consumable within an inventory for the image forming device; and processing circuitry coupled with the interface and configured to update the current inventory status responsive to the status message providing an updated inventory status;

wherein the storage circuitry is configured to store the current inventory status corresponding to at least one of a plurality of supply areas, the interface is configured to receive another status message indicating movement of a quantity of the imaging consumable from one supply area to another supply area, and the processing circuitry is configured to update at least one of the current and the updated inventory status responsive to the another status message.

23. A consumable management device comprising:

an interface adapted to communicate with an image forming device configured to use an imaging consumable to form a hard image, the interface being adapted to receive a status message from the image forming device corresponding to the status of the imaging consumable within the image forming device;

storage circuitry configured to store a current inventory status of the imaging consumable within an inventory for the image forming device; and processing circuitry coupled with the interface and configured to update the current inventory status responsive to the status message providing an updated inventory status;

wherein the processing circuitry is configured to generate an inventory status message corresponding to the status of the imaging consumable within the inventory;

wherein the interface is configured to couple with a plurality of image forming devices and the processing circuitry is configured to monitor the image forming devices coupled with the interface and to modify the inventory status message responsive to the monitoring.

* * * * *